United States Patent [19]
Angott et al.

[11] Patent Number: 6,009,358
[45] Date of Patent: Dec. 28, 1999

[54] PROGRAMMABLE LAWN MOWER

[75] Inventors: Paul G. Angott, Bloomfield Hills, Mich.; Thomas G. Xydis, 1141 Chestnut Rd., Ann Arbor, Mich. 48104

[73] Assignee: Thomas G. Xydis, Ann Arbor, Mich.; a part interest

[21] Appl. No.: 08/881,980

[22] Filed: Jun. 25, 1997

[51] Int. Cl.$^6$ .............................. B62D 11/04; B62D 5/04; A01D 34/78; A01D 69/02
[52] U.S. Cl. .............................. 701/25; 701/28; 180/6.5; 180/168; 180/169; 340/936; 340/825.22; 56/10.5; 56/13.3
[58] Field of Search ....................... 701/25, 28; 180/168, 180/169, 6.5; 56/10.5, 13.3; 340/825.22, 936

[56] References Cited

U.S. PATENT DOCUMENTS

| | | |
|---|---|---|
| 2,751,030 | 6/1956 | Null . |
| 3,789,939 | 2/1974 | Geislinger . |
| 4,133,404 | 1/1979 | Griffin ........................................ 56/10.5 |
| 4,184,559 | 1/1980 | Rass . |
| 4,482,960 | 11/1984 | Pryor . |
| 4,603,753 | 8/1986 | Yoshimura et al. . |
| 4,639,666 | 1/1987 | Strosser et al. . |
| 4,733,355 | 3/1988 | Davidson et al. . |
| 4,805,385 | 2/1989 | Bohman et al. . |
| 4,887,415 | 12/1989 | Martin . |
| 4,919,224 | 4/1990 | Shyu et al. . |
| 4,964,265 | 10/1990 | Young ........................................ 180/169 |
| 5,007,234 | 4/1991 | Shurman et al. . |
| 5,078,645 | 1/1992 | Bohman et al. . |
| 5,083,629 | 1/1992 | Chang . |
| 5,204,814 | 4/1993 | Noonan et al. ........................... 180/165 |
| 5,239,296 | 8/1993 | Jenkins . |
| 5,323,593 | 6/1994 | Cline et al. . |
| 5,426,584 | 6/1995 | Kamimura et al. ...................... 180/169 |
| 5,461,292 | 10/1995 | Zondlo ...................................... 180/169 |

*Primary Examiner*—William A. Cuchlinski, Jr.
*Assistant Examiner*—Olga Hernandez
*Attorney, Agent, or Firm*—Howard & Howard

[57] ABSTRACT

A programmable lawn mower assembly (10) including a carriage (12) supporting a mower central processing unit (CPU) (24) for controlling the drive motors (18) to control the direction of movement of the carriage (12). The assembly (10) includes first and second locating transmitters to be disposed on posts in spaced positions about the lawn with each locating transmitter simultaneously transmitting a radio frequency signal which travels at a first velocity and an audio signal which travels at a second velocity slower than said first velocity. A carriage receiver (50, 52) is disposed on the carriage (12) for receiving the radio and audio signals from the locating transmitters and for providing signals to the CPU (24) for determining the position of the carriage (12) relative to the locating transmitters by measuring the time between said radio and audio signals from each locating transmitter. The CPU (24) includes a sequence code circuit (57) for transmitting coded signals from the carriage transmitter (54) to the locating transmitters and each locating transmitter includes a code circuit (58) for receiving and identifying the its coded signal and for directing the locating transmitter to simultaneously send the first and second signals in response to the coded signal, each locating transmitter having its own coded signal. The system also includes wake-up circuits and acknowledgment circuits.

33 Claims, 5 Drawing Sheets

PROGRAMMABLE LAWN MOWER

BACKGROUND OF THE INVENTION

1. Field of the Invention

The subject invention relates to a utility vehicle which is self propelled and is controlled by a central processing unit to follow a predetermined route, and more specifically, to a lawn mower.

2. Description of the Prior Art

The prior art includes various systems wherein a lawn mower or harvester includes sensors for sensing uncut grass, wires in the ground, obstacles, or other devices to position itself. Some of these are discussed in U.S. Pat. Nos. 4,887,415 to Martin and 5,323,593 to Cline et al. The use of light to sense the path is disclosed in U.S. Pat. Nos. 2,751,030 to Null and 4,603,753 to Yoshimura et al. A tape recorder is used to record the path in U.S. Pat. No. 3,789,939 to Geislinger. A distance measuring system employing ultrasonic waves is disclosed in U.S. Pat. No. 4,733,355. An electro-optical and microcomputer for automatic guidance is disclosed in U.S. Pat. No. 4,482,960.

However, there is a need for a lawn mower which is user friendly for the average home owner to program to repeatedly mow a lawn of a particular configuration.

SUMMARY OF THE INVENTION AND ADVANTAGES

A programmable utility vehicle assembly comprising a carriage for moving over a lawn and supporting a cutting device for cutting a lawn and a power unit for driving the carriage over the lawn, and a mower central processing unit (CPU) for controlling the power unit to control the direction of movement of the carriage. The assembly is characterized by at least first and second locating transmitters to be disposed in spaced positions about the lawn with each locating transmitter simultaneously transmitting a first signal which travels at a first velocity and a second signal which travels at a second velocity slower than the first velocity, and a carriage receiver on the carriage for receiving the first and second signals from the locating transmitters and for providing signals to the CPU for determining the position of the carriage relative to the locating transmitters by measuring the time between the first and second signals from each locating transmitter.

The invention incorporates a method characterized by simultaneously transmitting from each locating transmitter a first signal which travels at a first velocity and a second signal which travels at a second velocity slower than the first velocity, receiving the first and second signals at the carriage receiver, sending signals from the carriage receiver to the CPU in response to receiving the first and second signals from each locating transmitter; and determining in the CPU the position of the carriage relative to the locating transmitters by measuring the time between the first and second signals from each locating transmitter to establish the distance to each locating transmitter.

Accordingly, the invention provides a system which can be programmed by the average home owner to repeatedly mow the owner's particularly shaped lawn.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
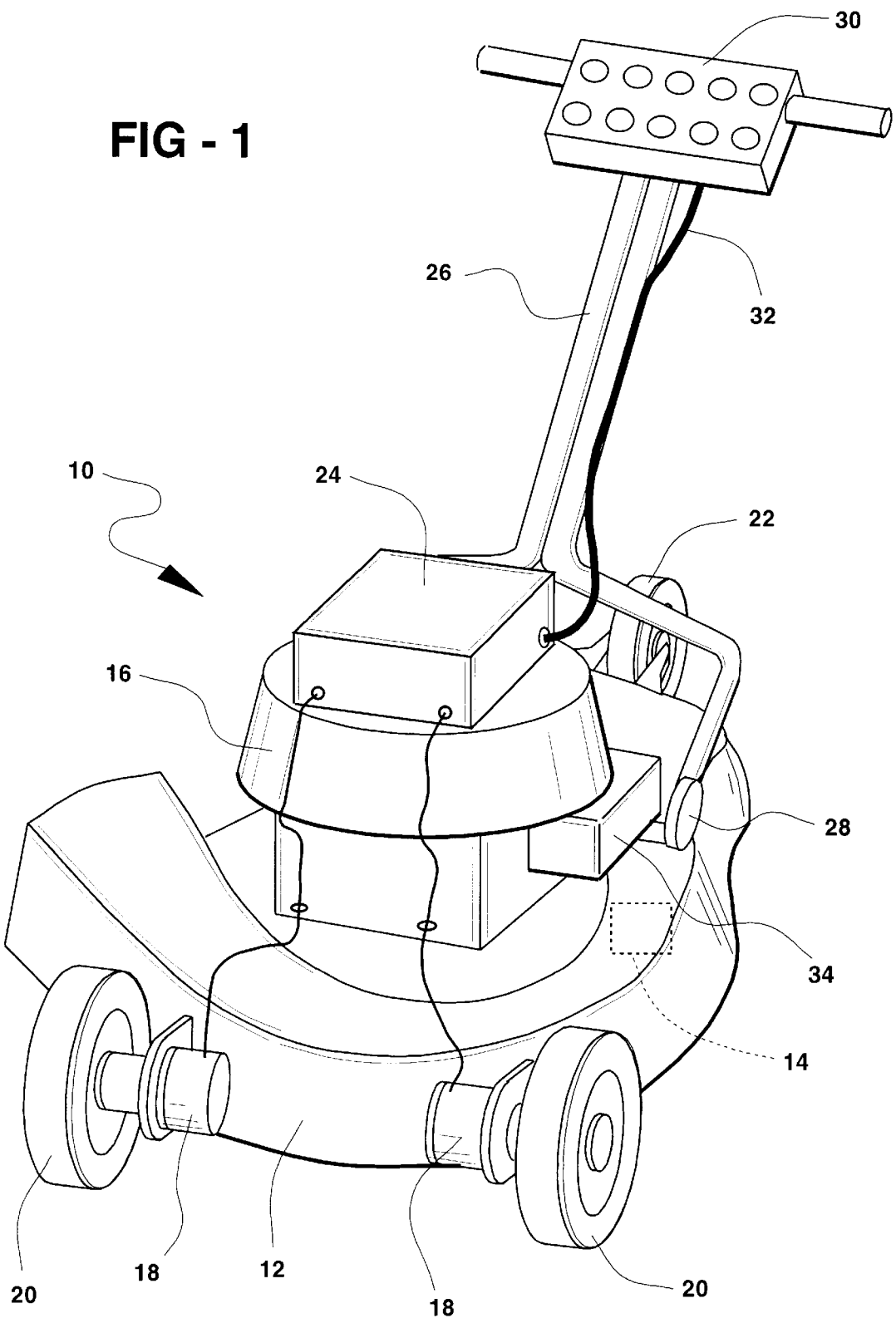
FIG. 1 is a perspective view of a lawn mower incorporating the subject invention.

Referring to the Figures, wherein like numerals indicate like or corresponding parts throughout the several views, a programmable utility vehicle in the form of a lawn mower assembly is generally shown at 10. The lawn mower assembly 10 comprises a carriage or frame 12 for moving over a lawn or other plot and a cutting device or blade 14 is supported by the carriage 12 for cutting a lawn or performing some other task on the plot. A power unit is disposed on the carriage 12 for driving or propelling the carriage 12 over the lawn and for rotating the blade. More specifically, the power unit includes an electric motor 16 for rotating the blade and electric motors 18 for rotating wheels 20. The carriage 12 is also supported by caster wheel 22 so that differential, forward and reverse rotation of the electric motors and wheels 20 steer the carriage 12 in very tight circles. A mower central processing unit, i.e., CPU 24, is supported on the carriage 12 for controlling the electric motors 16 and 18 which comprise the power unit to control the direction of movement of the carriage 12.

A steering device or handle 26 is removably attached to the carriage 12 by quick disconnects 28 and supports a programming pad 30 for programming the CPU 24. The steering handle 26 may also be collapsible. The pad 30 of the steering handle 26 includes an electronic serial number and a connector 32 for sending the serial number to the CPU 24 to allow the CPU 24 to be programmed. In other words, the electronic serial number acts as a key to initiate operation.

Figure 2:
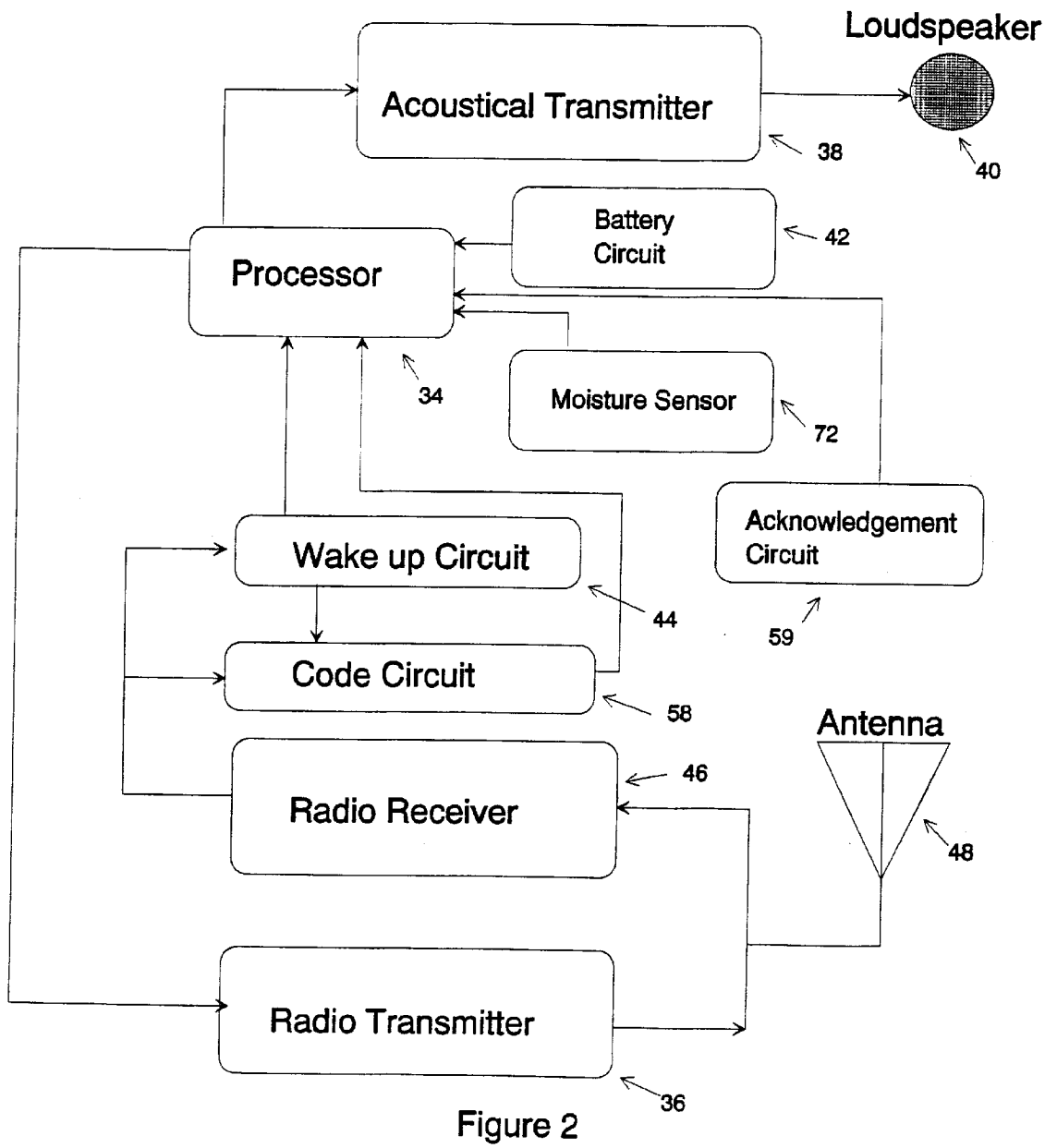
FIG. 2 is a schematic view of a locating transmitter of the subject invention.
Figure 3:
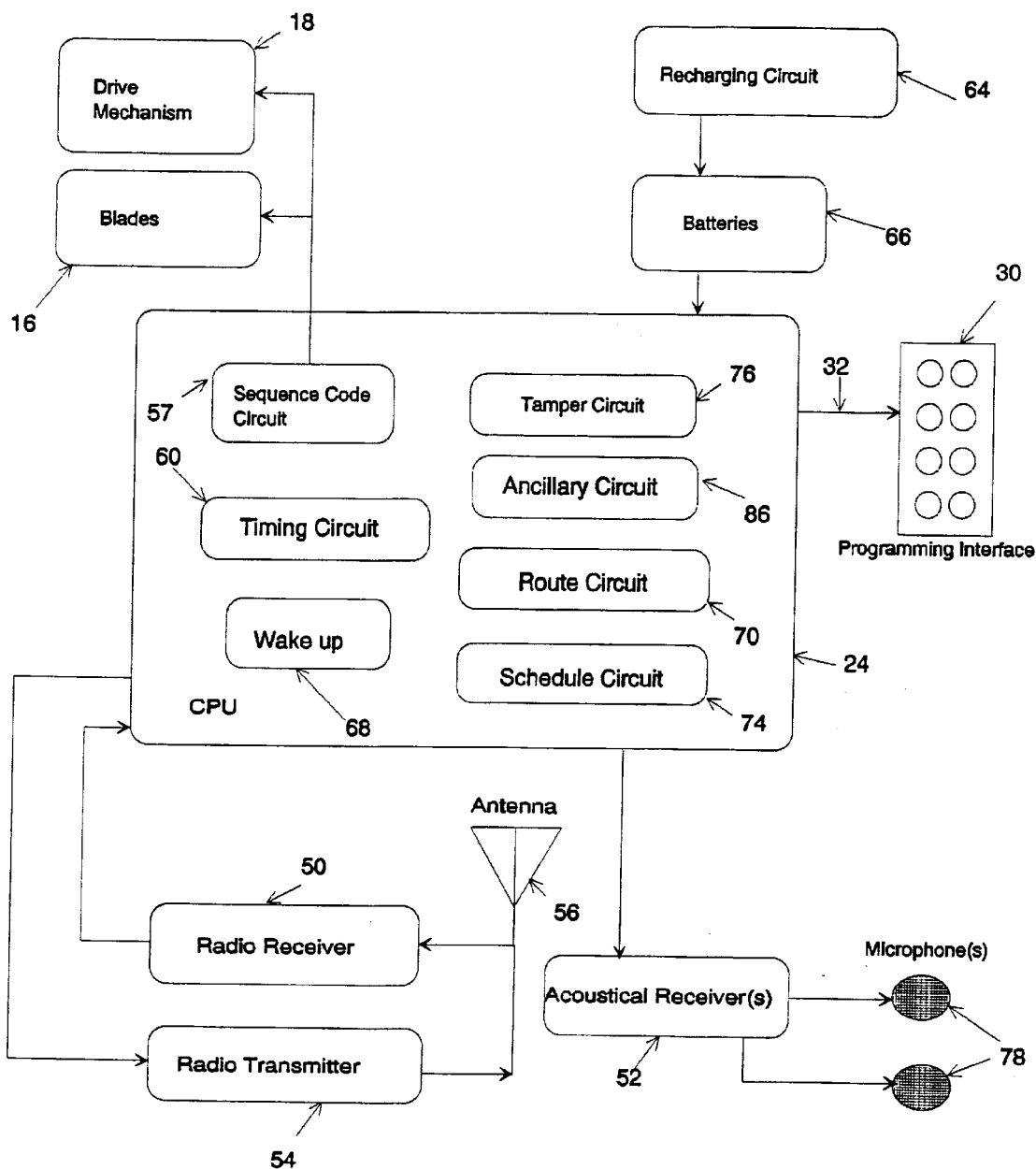
FIG. 3 is a schematic view of central processing unit (CPU) on the lawn mower.

The assembly 10 is characterized by at least first and second locating transmitters, i.e., a plurality of usually three, one of which is shown in FIG. 2 and each typically comprises a post supported in the ground. The locating transmitters are to be disposed in spaced positions about the lawn with each locating transmitter simultaneously transmitting a first signal which travels at a first velocity and a second signal which travels at a second velocity slower than the first velocity. Each locating transmitter includes a processor 34 for controlling the operation or sequencing of a radio frequency transmitter 36, which transmits the first signal as a radio frequency signal. The processor 34 also controls the operation or sequencing of an audio or acoustical transmitter 38, which transmits the second signal as an audio or acoustical signal. The audio or acoustical signal is propagated by a loudspeaker 40. Each locating transmitter also includes a battery circuit 42 for supplying battery power; although, the locating transmitters may be hard wired for electrical power. Each locating transmitter includes a radio receiver 46 for receiving a code signal, described more fully hereinafter. Each locating transmitter also includes a wake-up circuit 44 for initiating the supply of power from the battery circuit 42 in response to a wake-up code to initiate the transmission of the first and second signals. The radio frequency signals are transmitted and received at each locating transmitter by an antenna 48.

A carriage receiver on the lawn mower or carriage 12, comprises a radio frequency receiver 50 and an acoustical receiver 52, for receiving the first and second signals from the locating transmitters and for providing signals to the CPU 24 for determining the position of the carriage 12 relative to the locating transmitters by measuring the time between the first and second signals from each locating transmitter. The r.f. signal sent by the locating transmitter arrives, for all practical purposes, instantaneously at the r.f. receiver 50 to set a time zero for timing the period for the acoustical wave, which travels at the much slower speed of sound, to arrive at the acoustical receiver 52. This time difference establishes the distance of the carriage 12 from the locating transmitter.

In order for the CPU 24 to distinguish one locating transmitter from another, a carriage transmitter 54 is disposed on the carriage 12. An antenna 56 services both the receiver 50 and transmitter 54. The carriage CPU 24 includes a sequence code circuit 57 for transmitting first and second coded signals from the carriage transmitter 54 to the locating transmitters. In response, the first locating transmitter includes a receiver having a first code circuit 58 for receiving and identifying the first coded signal at the first locating transmitter and for directing the first locating transmitter to simultaneously send the radio and audio signals from the first locating transmitter in response to the first coded signal. A second code circuit 58 is likewise included in the second locating transmitter for receiving and identifying the second coded signal at the second locating transmitter and for directing the second locating transmitter to simultaneously send its radio and audio signals from the second locating transmitter in response to the second coded signal. There is included a coded circuit for each location transmitter and each coded circuit typically consists of software programmed into the CPU 24 and processors 34.

In addition, the processor 34 of first locating transmitter includes a first acknowledgment circuit 59 for transmitting a first acknowledgment signal from the first locating transmitter in response to the first coded signal and the CPU 24 includes a timing circuit 60 for receiving the first acknowledgment signal from the carriage receiver 50 and 52 to advise the CPU 24 to expect the first and second signals from the first locating transmitter within a predetermined time period. The processor 34 of the second locating transmitter likewise includes a second acknowledgment circuit 59 for transmitting a second acknowledgment signal from the second locating transmitter in response to the second coded signal, and the timing circuit 60 in the CPU 24 receives the second acknowledgment signal from the carriage receiver 50 and 52 to advise the CPU 24 to expect the first and second signals from the second locating transmitter within a predetermined time period.

Normally, the carriage 12 is stored at a storage dock or shed 62 in a dormant state while the locator transmitters are in a dormant state, i.e., negligible power drain. The storage dock 62 includes a battery recharging circuit 64 for recharging a battery power supply consisting of a battery pack 66 when the carriage 12 is in the storage dock 62. The storage dock or shed 62 can also serve as a locating transmitter. Furthermore, the shed is a security device by sharing a security code with the CPU 24 so that the carriage 12 will lock up if it removed from its specific shed in an unauthorized manner. Thus, if the shed is a permanent fixture, theft is deterred. The CPU 24 also contains a circuit for monitoring the charge on the batteries so that the carriage 12 will not operate or will return to the shed if the batteries have an insufficient charge.

In order to initiate operation of the entire system, each locating transmitter includes the wake-up, turn-on circuit 44 for supplying sufficient power for transmitting the first and second signals and the CPU 24 includes a wake-up code circuit 68 for transmitting a wake-up code to the wake-up circuit 44.

The steering handle 26 is attached to the carriage 12 for steering the carriage 12 over a route for the first time, however, the subsequent mowing of the lawn are automatic as the CPU 24 includes a route memory circuit 70 for memorizing the route in the CPU 24 and repeatedly moving the carriage 12 over the lawn in response to the CPU 24 following the memorized route. In case of rain, a moisture sensor 72 is disposed somewhere about the lawn, preferably on the locating transmitters as shown, for sensing the presence of a predetermined amount of moisture and directing the carriage 12 to follow an alternate route, such back to the storage shed 58.

The CPU 24 on the carriage 12 also includes the CPU 24 includes a scheduling circuit 74 for storing predetermined times in the CPU 24 for the carriage 12 to automatically follow the memorized route. The programming pad 30 on the handle 26 can be used to set times when the lawn is to be mowed.

The CPU 24 further includes a tamper circuit 76 for detecting prohibited positions of the carriage 12 and for operating the carriage 12 in accordance with a predetermined program. In other words, a mercury switch could be employed to shut the system off in the event the carriage 12 were tilted beyond set limits.

In order to add a degree of accuracy to the system, the carriage receiver 50 and 52 includes two pick-ups or microphones 78 spaced from one another on the carriage 12 for receiving the acoustical signals at spaced positions on the carriage 12 to allow the CPU 24 to differentiate the time between the arrival of the acoustical signals at the spaced positions to angularly position the carriage 12 relative to each of the locating transmitters. In this mode only one locating transmitter need be utilized and that can be in the storage dock or shed 58.

Figure 5:
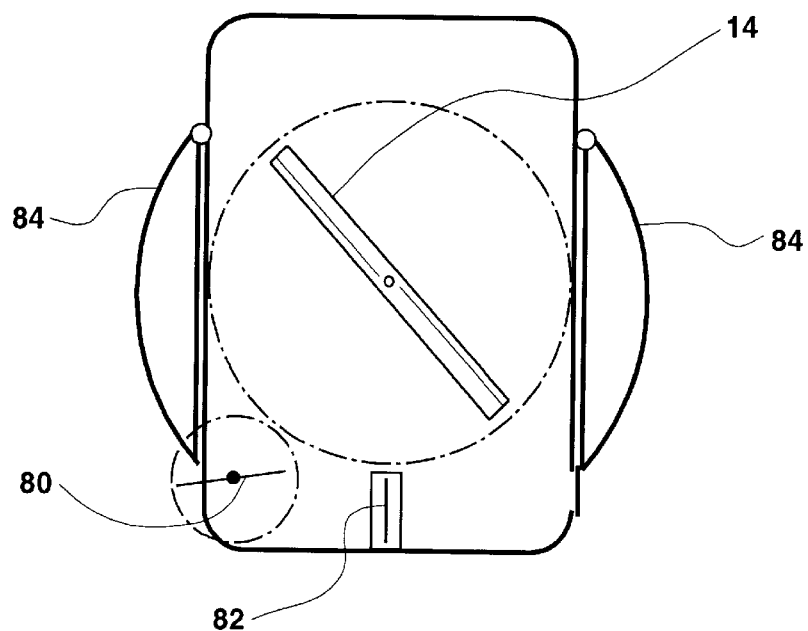
FIG. 5 is a schematic view of a lawn mower including operational accessories.
Figure 6:
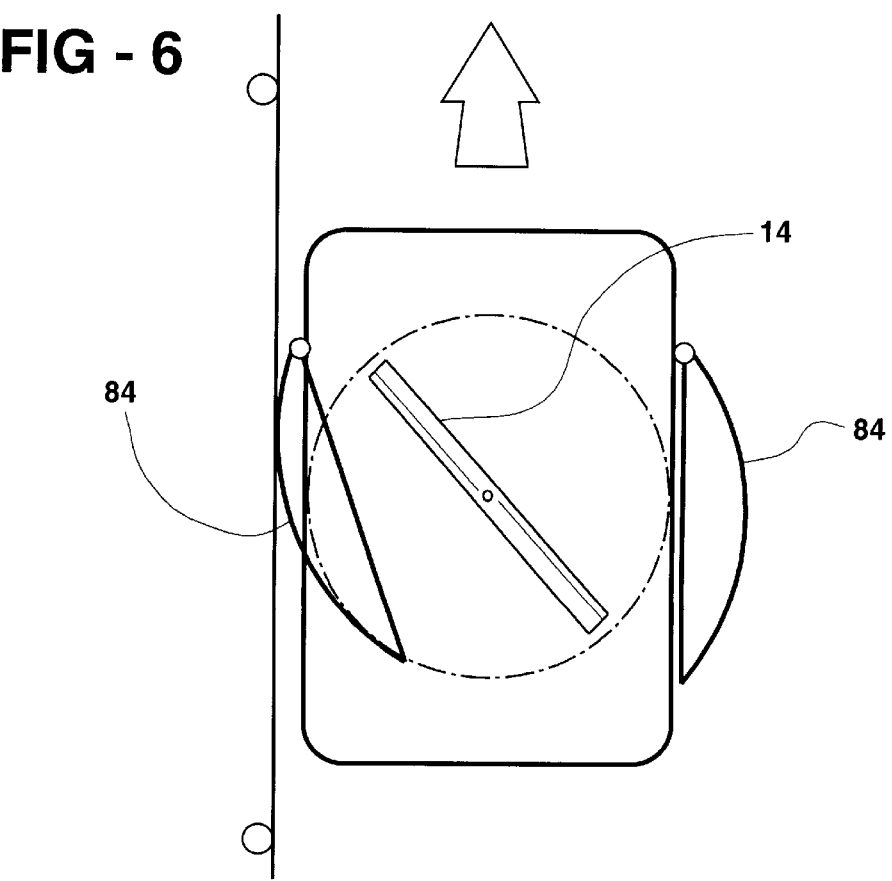
FIG. 6 is a schematic view of a lawn mower showing one of the operational accessories in a moved position.

As best illustrated in FIGS. 5 and 6, the carriage 12 can include various accessories, such as a string trimmer 80, an edger 82, a movably mounted blade guard 84, etc. Accordingly, the CPU 24 includes an ancillary circuit 86 to operate the accessory at a predetermined position, e.g., to retract the guard along a fence to cut close to the fence, or to operate the trimmer 80 or the edger 82.

Figure 4:
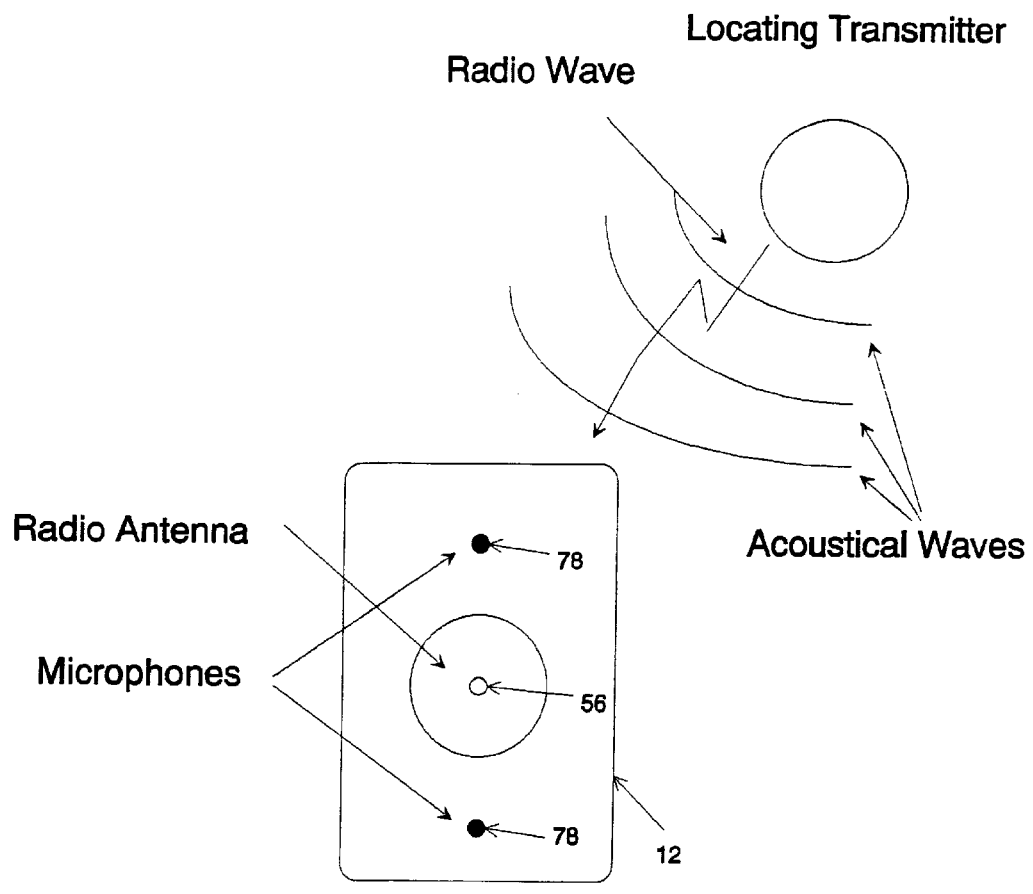
FIG. 4 is a schematic view of the system deployed on a lawn.
Figure 4:
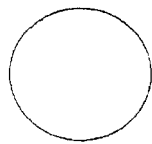
Figure 4:
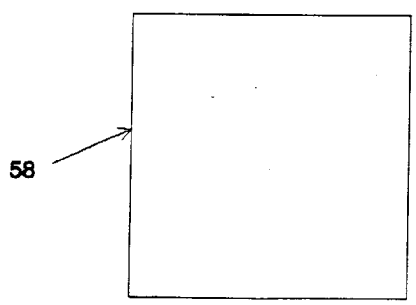

The invention, therefore, encompasses a method of programming a mower central processing unit (CPU) 24 on a lawn mower having a power unit 16 and 18 for driving and directing the lawn mower over the lawn in response to instructions from the CPU 24. The method comprises the steps of placing at least first and second locating transmitters (one shown in FIG. 2) in spaced positions about the lawn as illustrated in FIG. 4.

The method is characterized by simultaneously transmitting from each locating transmitter a first signal which travels at a first velocity and a second signal which travels at a second velocity slower than the first velocity, receiving the first and second signals at the carriage receiver 50 and 52, sending signals from the carriage receiver to the CPU 24 in response to receiving the first and second signals from each locating transmitter, and determining in the CPU 24 the position of the carriage 12 relative to the locating transmitters by measuring the time between the first and second signals from each locating transmitter to establish the distance to each locating transmitter. The first signal is a radio frequency signal so that it arrives instantaneously at the carriage 12 to establish time zero and the CPU 24 waits for the second signal which is at the much slower speed of sound from this time zero.

The method is further defined as transmitting first and second coded signals from the carriage transmitter 54 to the locating transmitters, receiving and identifying the first coded signal at the first locating transmitter and sending the first and second signals from the first locating transmitter in response to the first coded signal, and receiving and identifying the second coded signal at the second locating transmitter and sending the first and second signals from the second locating transmitter in response to the second coded signal.

The method includes the step of transmitting a first acknowledgment signal from the first locating transmitter in response to the first coded signal and receiving the first acknowledgment signal at the carriage receiver 50 and 52 to advise the CPU 24 to expect the first and second signals from the first locating transmitter, transmitting a second acknowledgment signal from the second locating transmitter in response to the second coded signal and receiving the second acknowledgment signal at the carriage receiver 50 and 52 to advise the CPU 24 to expect the first and second signals from the second locating transmitter.

A further step is the transmitting of a wake-up code from the carriage transmitter 54 and supplying sufficient power to each locating transmitter for transmitting the signals in response to the wake-up code.

To enhance the accuracy, the receiving of the first and second signals at the carriage receiver 50 and 52 is enhanced by receiving the first and second signals at spaced positions 78 on the carriage 12 and differentiating the time between the arrival of each signal at the spaced positions to angularly position the carriage 12 relative to each of the locating transmitters. In addition or alternatively, the time of arrival of the signals at the respective microphones can be averaged to determine the distance to each locating transmitter. Furthermore, the distance between the microphones is known and forms one side of a triangle with the other two sides being between each microphone and the locating transmitter to triangulate and determine the angular position of the carriage relative to each locating transmitter.

An initial set up step is the steering of the carriage 12 over the lawn while memorizing the route in the CPU 24 and repeatedly moving the carriage 12 over the lawn in response to the CPU 24 following the memorized route. Attendant to this is the setting of predetermined times in the CPU 24 for the carriage 12 to automatically follow the memorized route. The CPU 24 performs the step of continually comparing its actual position to the memorized position and continually correcting the direction of movement of the carriage 12 to follow the memorized route.

Also included are the auxiliary steps of: sensing the presence of moisture and overriding the memorized route and directing the carriage 12 to follow an alternate route in response to a predetermined amount of moisture, and/or programming the CPU 24 with an ancillary function to operate an accessory at a predetermined position in the memorized route.

The audio signal to be transmitted will be of a frequency and constant level to be easily differentiated from lawn mower noises and other environmental noises. Instead of each locating transmitter being completely independent of other locating transmitters, repeater transmitters may be employed for long routes whereby the carriage is handed off from one locator transmitter to a repeater transmitter which is matched to the handing off transmitter. Alternatively, the first radio signal and second audio signal may be transmitted from the carriage 12 with the locating posts acting as receivers, i.e., the devices may be transceivers to receive and/or transmit signals.

By way of example, the drive system may take the form of that disclosed in U.S. Pat. No. 5,083,629 issued to Chang on Jan. 28, 1992, or that disclosed in U.S. Pat. No. 4,887,415 issued to Martin on Dec. 19, 1989.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A programmable utility vehicle assembly 10 comprising;

a carriage 12 for moving over a plot, a device 14 supported by said carriage 12 for performing a task over the plot, a power unit 16 and 18 for driving said carriage 12 over the plot, a vehicle central processing unit (CPU) 24 for controlling the power unit (16 and 18) to control the direction of movement of the carriage 12, said assembly 10 characterized by a locating transceiver to be disposed on the plot, a carriage transceiver (50, 52) on said carriage 12, one of said locating transceiver and said a carriage transceiver (50, 52) simultaneously transmitting a first signal which travels at a first velocity and a second signal which travels at a second velocity slower than said first velocity and the other of said locating transceiver and said a carriage transceiver (50, 52) for determining the position of the carriage 12 relative to said locating transceiver by measuring the time between said first and second signals.

2. A method of programming a vehicle central processing unit (CPU) 24 on a utility vehicle having a power unit 16 and 18 for driving and directing the vehicle over a plot in response to instructions from the CPU 24, said method comprising the steps of;

placing a locating transceiver in the plot;

placing a carriage transceiver on the carriage 12;

said method characterized by simultaneously transmitting and receiving a first signal which travels at a first velocity and a second signal which travels at a second velocity slower than the first velocity between the transceivers, and determining in the CPU 24 the position of the carriage 12 relative to the locating transceiver by measuring the time of arrival between the first and second signals from to establish the distance between the locating transceiver and the carriage transceiver.

3. A method of programming a vehicle central processing unit (CPU) 24 on a utility vehicle having a power unit 16 and 18 for driving and directing the vehicle over a plot in response to instructions from the CPU 24, said method comprising the steps of;

placing at least first and second locating transmitters in spaced positions about the plot;

placing a carriage receiver on the carriage 12;

said method characterized by simultaneously transmitting from each locating transmitter a first signal which travels at a first velocity and a second signal which travels at a second velocity slower than the first velocity, receiving the first and second signals at the carriage receiver 50 and 52, sending signals from the carriage receiver to the CPU 24 in response to receiving the first and second signals from each locating transmitter;

and determining in the CPU 24 the position of the carriage 12 relative to the locating transmitters by measuring the time between the first and second signals from each locating transmitter to establish the distance to each locating transmitter.

4. A method as set forth in claim 3 including transmitting a wake-up code from the carriage transmitter 54 and supplying sufficient power to each locating transmitter for transmitting the signals in response to the wake-up code.

5. A method as set forth in claim 3 wherein the receiving of the first and second signals at the carriage receiver 50 and 52 is further defined as receiving the first and second signals at spaced positions on the carriage 12 and differentiating the time between the arrival of each signal at said spaced positions to angularly position the carriage 12 relative to each of the locating transmitters.

6. A method as set forth in claim 3 including sensing the presence of moisture and overriding the memorized route and directing the carriage 12 to follow an alternate route in response to a predetermined amount of moisture.

7. A method as set forth in claim 3 including programming the CPU 24 with an ancillary function to operate an accessory at a predetermined position in the memorized route.

8. A method as set forth in claim 3 further defined as transmitting the first signal as a radio frequency signal.

9. A method as set forth in claim 8 further defined as transmitting the second signal as an audio signal.

10. A method as set forth in claim 3 further defined as transmitting first and second coded signals from the carriage transmitter 54 to the locating transmitters, receiving and identifying the first coded signal at the first locating transmitter and sending the first and second signals from the first locating transmitter in response to the first coded signal, and receiving and identifying the second coded signal at the second locating transmitter and sending the first and second signals from the second locating transmitter in response to the second coded signal.

11. A method as set forth in claim 10 further defined as transmitting a first acknowledgment signal from the first locating transmitter in response to the first coded signal and receiving the first acknowledgment signal at the carriage receiver 50 and 52 to advise the carriage receiver 50 and 52 to expect the first and second signals from the first locating transmitter, transmitting a second acknowledgment signal from the second locating transmitter in response to the second coded signal and receiving the second acknowledgment signal at the carriage receiver 50 and 52 to advise the CPU 24 to expect the first and second signals from the second locating transmitter.

12. A method as set forth in claim 3 including steering the carriage 12 over the lawn, memorizing the route in the CPU 24 and repeatedly moving the carriage 12 over the lawn in response to the CPU 24 following the memorized route.

13. A method as set forth in claim 12 including setting predetermined times in the CPU 24 for the carriage 12 to automatically follow the memorized route.

14. A method as set forth in claim 12 including continually comparing the actual position to the memorized position and continually correcting the direction of movement of the carriage 12 to follow the memorized route.

15. A programmable utility vehicle assembly 10 comprising;

a carriage 12 for moving over a plot, a device 14 supported by said carriage 12 for performing a task over the plot, a power unit 16 and 18 for driving said carriage 12 over the plot, a vehicle central processing unit (CPU) 24 for controlling the power unit (16 and 18) to control the direction of movement of the carriage 12, said assembly 10 characterized by first and second locating transmitters to be disposed in spaced positions about the plot with each locating transmitter simultaneously transmitting a first signal which travels at a first velocity and a second signal which travels at a second velocity slower than said first velocity, and a carriage receiver (50, 52) on said carriage 12 for receiving said first and second signals from said locating transmitters and for providing signals to said CPU 24 for determining the position of the carriage 12 relative to said locating transmitters by measuring the time between said first and second signals from each locating transmitter.

16. An assembly as set forth in claim 15 wherein said CPU 24 includes a tamper circuit 76 for detecting prohibited positions of said carriage 12 and for operating said carriage 12 in accordance with a predetermined program.

17. An assembly as set forth in claim 15 wherein each locating transmitter includes a wake-up circuit 44 for supplying sufficient power for transmitting said first and second signals, and said CPU 24 includes a wake-up code circuit 68 for transmitting a wake-up code to said wake-up circuit 44.

18. An assembly as set forth in claim 15 wherein said carriage receiver 50 and 52 includes two pick-ups 78 spaced from one another on said carriage 12 for receiving the second signal at spaced positions on the carriage 12 to allow said CPU 24 to differentiate the time between the arrival of the second signal at said spaced positions to angularly position the carriage 12 relative to each of the locating transmitters.

19. An assembly as set forth in claim 15 including a moisture sensor 72 for sensing the presence of a predetermined amount of moisture and directing the carriage 12 to follow an alternate route.

20. An assembly as set forth in claim 15 wherein said carriage 12 includes an accessory and said CPU 24 includes an ancillary circuit 86 to operate said accessory at a predetermined position.

21. An assembly as set forth in claim 15 wherein said first signal is further defined as a radio frequency signal.

22. An assembly as set forth in claim 21 wherein said second signal is further defined as an audio signal.

23. An assembly as set forth in claim 15 including a carriage transmitter 54 on said carriage 13, said CPU 24 including a sequence code circuit 57 for transmitting first and second coded signals from said carriage transmitter 54 to the locating transmitters, a first code circuit 58 on said first locating transmitter for receiving and identifying the first coded signal at the first locating transmitter and for directing said first locating transmitter to simultaneously send the first and second signals from said first locating transmitter in response to the first coded signal, and a second code circuit on said second locating transmitter for receiving and identifying the second coded signal at the second locating transmitter and for directing said second locating transmitter to simultaneously send the first and second signals from said second locating transmitter in response to the second coded signal.

24. An assembly as set forth in claim 23 wherein said first locating transmitter includes a first acknowledgment circuit 59 for transmitting a first acknowledgment signal from said first locating transmitter in response to the first coded signal, said CPU 24 including a timing circuit 60 for receiving the first acknowledgment signal from the carriage receiver (50 and 52) to advise the CPU 24 to expect the first and second signals from the first locating transmitter within a predetermined time period, said second locating transmitter includes a second acknowledgment circuit for transmitting a second acknowledgment signal from said second locating transmitter in response to the second coded signal, and said timing circuit 60 receives the second acknowledgment signal from the carriage receiver (50 and 52) to advise the CPU 24 to expect the first and second signals from the second locating transmitter within a predetermined time period.

25. An assembly as set forth in claim 15 including a steering device 26 attached to said carriage 12, said steering device 26 including a serial number and connector 32 for sending the serial number to said CPU 24 to allow said CPU 24 to be programmed.

26. An assembly as set forth in claim 25 wherein said steering device 26 includes a programming pad 30 connected to said CPU 24 for programming said CPU 24.

27. An assembly as set forth in claim 15 including a steering device 26 attached to said carriage 12 for steering said carriage 12 over a route, said CPU 24 including a memory circuit 70 for memorizing the route in the CPU 24 and repeatedly moving the carriage 12 over the lawn in response to the CPU 24 following the memorized route.

28. An assembly as set forth in claim 27 wherein said CPU 24 includes a scheduling circuit 74 for storing predetermined times in the CPU 24 for the carriage 12 to automatically follow the memorized route.

29. An assembly as set forth in claim 15 wherein said first signal is further defined as a radio frequency signal and said carriage receiver includes an antenna 48 for receiving said radio frequency signal.

30. An assembly as set forth in claim 29 wherein said second signal is further defined as an acoustical signal and said carriage receiver includes a microphone 78 for receiving said acoustical signal.

31. An assembly as set forth in claim 15 wherein each locating transmitter includes a battery circuit 42 for supplying battery power, a wake-up circuit 44 for initiating the supply of power from said battery circuit 42 in response to a wake-up code to initiate the transmission of said first and second signals, and said CPU 24 including a wake-up code circuit 68 for transmitting said wake-up code to said wake-up circuit 44.

32. An assembly as set forth in claim 21 including a battery power supply (66) on said carriage 12 for supplying electrical power to said CPU 24.

33. An assembly as set forth in claim 32 including a storage dock 62 for said carriage 12 including a battery recharging circuit 64 for recharging said battery power supply 66 when said carriage 12 is in said storage dock 62.

* * * * *

UNITED STATES PATENT AND TRADEMARK OFFICE
CERTIFICATE OF CORRECTION

PATENT NO. : 6,009,358
DATED : December 28, 1999
INVENTOR(S) : Paul G. Angott, et. al.

It is certified that error appears in the above-identified patent and that said Letters Patent is hereby corrected as shown below:

Claim 23, Column 8, Line 64, delete "carriage 13" and insert --carriage 12--
Claim 31, Column 10, Line 19, delete "claim 15" and insert --claim 1--
Claim 32, Column 10, Line 27, delete "claim 21" and insert --claim 31"--
Claim 33, Column 10, Line 30, delete "claim 32" and insert --claim 1"--

Signed and Sealed this

Fifth Day of December, 2000

Attest:

Q. TODD DICKINSON

Attesting Officer

Director of Patents and Trademarks